United States Patent
Karella et al.

(10) Patent No.: US 11,438,782 B2
(45) Date of Patent: *Sep. 6, 2022

(54) DYNAMIC OFFLOADING OF V2X SERVICES TO DSRC

(71) Applicant: Apple Inc., Cupertino, CA (US)

(72) Inventors: Ranganadh Karella, San Diego, CA (US); Meghashree Dattatri Kedalagudde, Hillsboro, OR (US); Dave A. Cavalcanti, Portland, OR (US); Ana Lucia Pinheiro, Portland, OR (US)

(73) Assignee: Apple Inc., Cupertino, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 16/883,525

(22) Filed: May 26, 2020

(65) Prior Publication Data

US 2020/0288341 A1 Sep. 10, 2020

Related U.S. Application Data

(63) Continuation of application No. 16/306,501, filed as application No. PCT/US2017/039554 on Jun. 27, 2017, now Pat. No. 10,687,242.

(Continued)

(51) Int. Cl.
| | |
|---|---|
| *H04W 24/10* | (2009.01) |
| *H04W 28/08* | (2009.01) |
| *H04W 36/14* | (2009.01) |
| *H04W 4/44* | (2018.01) |
| *H04L 43/062* | (2022.01) |
| *H04W 28/02* | (2009.01) |

(Continued)

(52) U.S. Cl.
CPC .......... *H04W 24/10* (2013.01); *H04L 43/062* (2013.01); *H04W 4/44* (2018.02); *H04W 28/08* (2013.01); *H04W 36/14* (2013.01); *H04W 4/40* (2018.02); *H04W 28/02* (2013.01); *H04W 88/06* (2013.01); *H04W 88/10* (2013.01)

(58) Field of Classification Search
CPC ....... H04W 24/10; H04W 4/44; H04W 28/08; H04L 43/062
USPC ........................................................ 370/329
See application file for complete search history.

(56) References Cited

U.S. PATENT DOCUMENTS

| | | |
|---|---|---|
| 9,225,782 B2 | 12/2015 | Addepalli et al. |
| 10,687,242 B2 * | 6/2020 | Karelia ............... H04L 43/062 |
| 2013/0162445 A1 | 6/2013 | Bessler et al. |

FOREIGN PATENT DOCUMENTS

WO WO-2018005531 A * 1/2018 ............ H04W 24/10

* cited by examiner

*Primary Examiner* — Peter G Solinsky
(74) *Attorney, Agent, or Firm* — Kowert, Hood, Munyon, Rankin & Goetzel, P.C.

(57) ABSTRACT

Systems and methods of providing V2X communications are generally described. The multimode UE communicates V2X messages with an eNB. The eNB detects whether the UE is able to receive messages from a nearby DSRC RSU based on measurements received from the UE and reported to the eNB. Based on the measurements, the eNB offloads V2X traffic to the DSRC RSU and triggers the UE to start communicating the V2X services from the DSRC RSU rather than the eNB. The measurements are reported in a BSR or DSRC MAC control element or RRC measurement report. The measurement report includes DSRC presence fields, CCH measurements and SCH measurements for each DSRC RSU that the UE is able to detect.

20 Claims, 11 Drawing Sheets

Related U.S. Application Data

(60) Provisional application No. 62/360,057, filed on Jul. 8, 2016, provisional application No. 62/357,126, filed on Jun. 30, 2016.

(51) Int. Cl.
*H04W 4/40* (2018.01)
*H04W 88/06* (2009.01)
*H04W 88/10* (2009.01)

DYNAMIC OFFLOADING OF V2X SERVICES TO DSRC

PRIORITY CLAIM

This application is a continuation of U.S. patent application Ser. No. 16/306,501, filed Nov. 30, 2018, entitled "DYNAMIC OFFLOADING OF V2X SERVICES TO DSRC", which is a U.S. National Stage filing under 35 U.S.C. 371 from International Application No. PCT/US2017/039554, filed Jun. 27, 2017, which claims the benefit of priority to U.S. Provisional Patent Application Ser. No. 62/357,126, filed Jun. 30, 2016, entitled "DYNAMIC OFFLOADING OF V2X SERVICES TO DSRC," and U.S. Provisional Patent Application Ser. No. 62/360,057, filed Jul. 8, 2016, entitled "DSRC MEASUREMENTS SUPPORT IN A 3GPP NETWORK," which are incorporated herein by reference in their entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to radio access networks. Some embodiments relate to vehicle-to-every thing (V2X) communications in various radio access technologies (RATs) including cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

The use of 3GPP LTE systems (including both LTE and LTE-A systems) has increased due to both an increase in the types of devices user equipment (UEs) using network resources as well as the amount of data and bandwidth being used by various applications, such as video streaming, operating on these UEs. For example, the growth of network use by Internet of Things (IoT) UEs, which include machine type communication (MTC) devices such as sensors and may use machine-to-machine (M2M) communications, as well as the burgeoning V2X communications, has severely strained network resources and increased communication complexity. V2X communications of a variety of different applications from a UE are to coordinate with various technologies, as well as among potentially rapidly moving vehicles. This may be particularly relevant to future generations of UEs, which may be able to communicate using various technologies. At present, however, at most a limited amount of control information may be able to be passed between these disparate technologies, leading to a number of issues.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
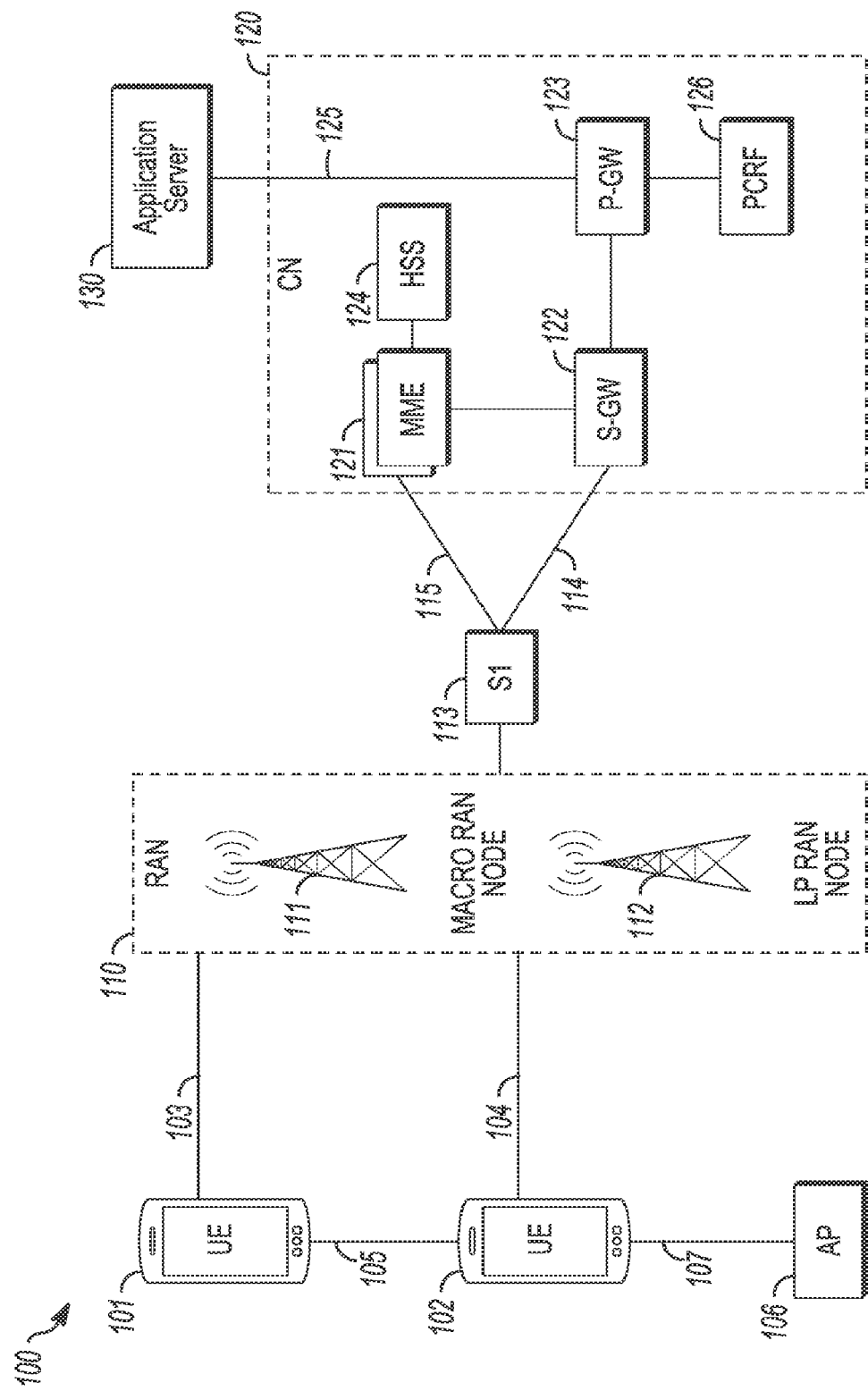
FIG. 1 illustrates an architecture of a system of a network in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN). Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a Ne2Gen IRAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), ne2 Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency do main, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, w here each CC E may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level. L=1, 2, 4, or 8).

Some embodiments may use concepts for resource allocation for control channel information that are an e2ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a Ne2Gen Packet Core (NPC) network, or some other type of CN. In this embodiment, the S1 interface 113 is split into two parts the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility Other responsibilities may include lawful intercept, charging, and some policy enforcement.

The P-GW 123 may terminate an SGi interface toward a PDN. The P-GW 123 may route data packets between the EPC network 123 and e2ernal networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.) In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
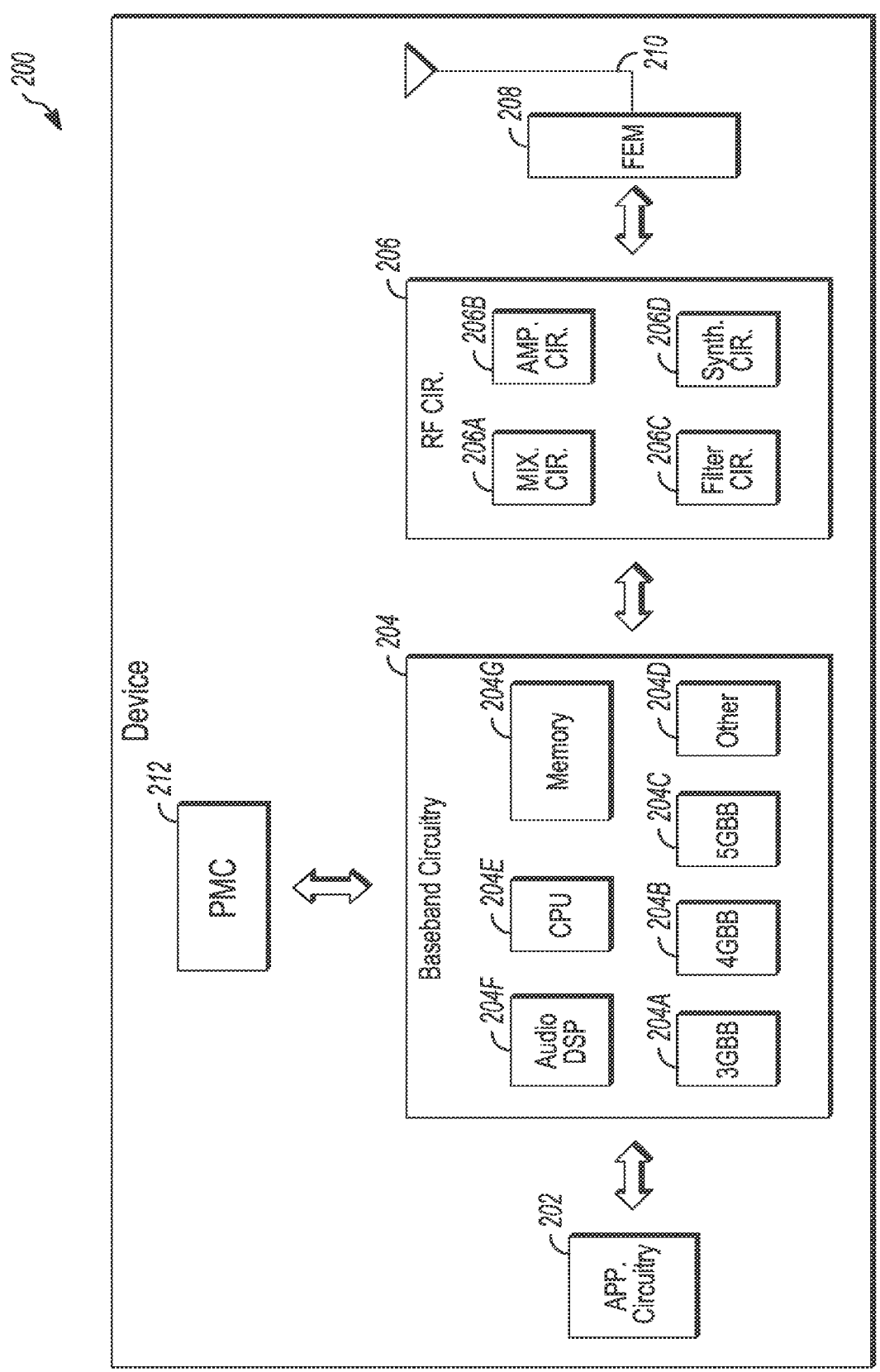
FIG. 2 illustrates example components of a device in accordance with some embodiments.

FIG. 2 illustrates example components of a device 200 in accordance with some embodiments. In some embodiments, the device 200 may include application circuitry 202, baseband circuitry 204. Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200) may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, m some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU)

204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Panty Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206, may enable communication with wireless networks using modulated electromagnetic radiation through a non-solid medium. In various embodiments, the RF circuitry 206 may include switches, filters, amplifiers, etc. to facilitate the communication with the wireless network RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206A, amplifier circuitry 206B and filter circuitry 206C In some embodiments, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some embodiments, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206A of the receive signal path may comprise passive mixers, although the scope of the embodiments is not limited in this respect.

In some embodiments, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 204 and may be filtered by filter circuitry 206C.

In some embodiments, the mixer circuitry 206A of the receive signal path and the mixer circuitry 206A of the transmit signal path may include two or more mixers and may be arranged for quadrature downconversion and upconversion, respectively. In some embodiments, the mixer circuitry 206A of the receive signal path and the mixer circuitry 206A of the transmit signal path may include two or more mixers and may be arranged for image rejection (e.g., Hartley image rejection). In some embodiments, the mixer circuitry 206A of the receive signal path and the mixer circuitry 206A may be arranged for direct downconversion and direct upconversion, respectively. In some embodiments, the mixer circuitry 206A of the receive signal path and the mixer circuitry 206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206D may be a fractional-N synthesizer or a fractional N/N+1 synthesizer, although the scope of the embodiments is not limited in this respect as other types of frequency synthesizers may be suitable. For example, synthesizer circuitry 206D may be a delta-sigma synthesizer, a frequency multiplier, or a synthesizer comprising a phase-locked loop with a frequency divider.

The synthesizer circuitry 206D may be configured to synthesize an output frequency for use by the mixer circuitry 206A of the RF circuitry 206 based on a frequency input and a divider control input. In some embodiments, the synthesizer circuitry 206D may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO) In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuit y 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing to desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an e2ended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein. Layer 2 may comprise a medium access control (MAC) layer, a radio link control (RLC) layer, and a packet data convergence protocol (PDCP) layer, described in further detail below. As referred to herein. Layer 1 may comprise a physical (PHY) layer of a UE/RAN node, described in further detail below.

Figure 3:
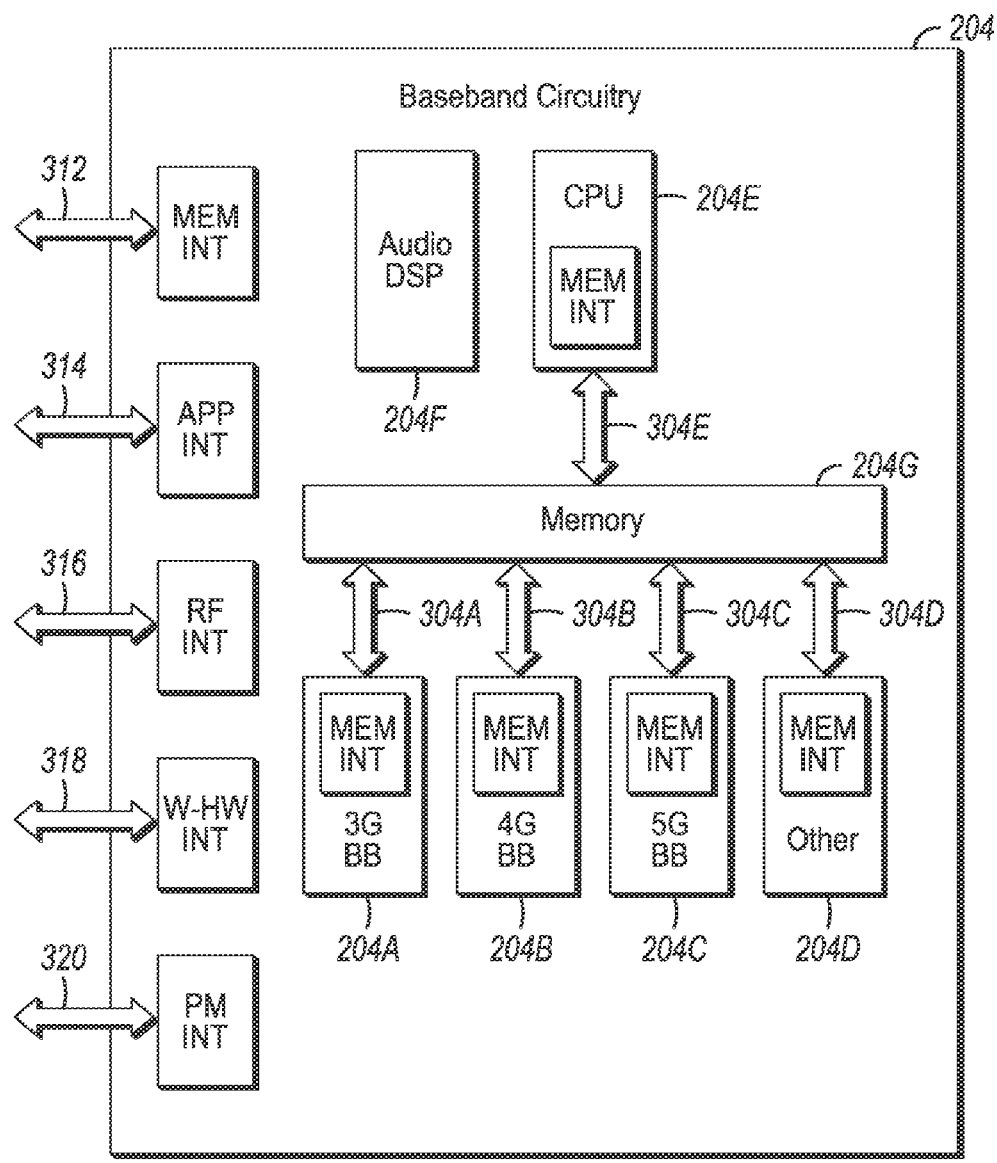
FIG. 3 illustrates example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface. 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory e2ernal to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy). WI-Fir, components, and other communication components), and a power management interface 320 (e.g., an interface to send/receive power or control signals to/from the PMC 212).

Figure 4:
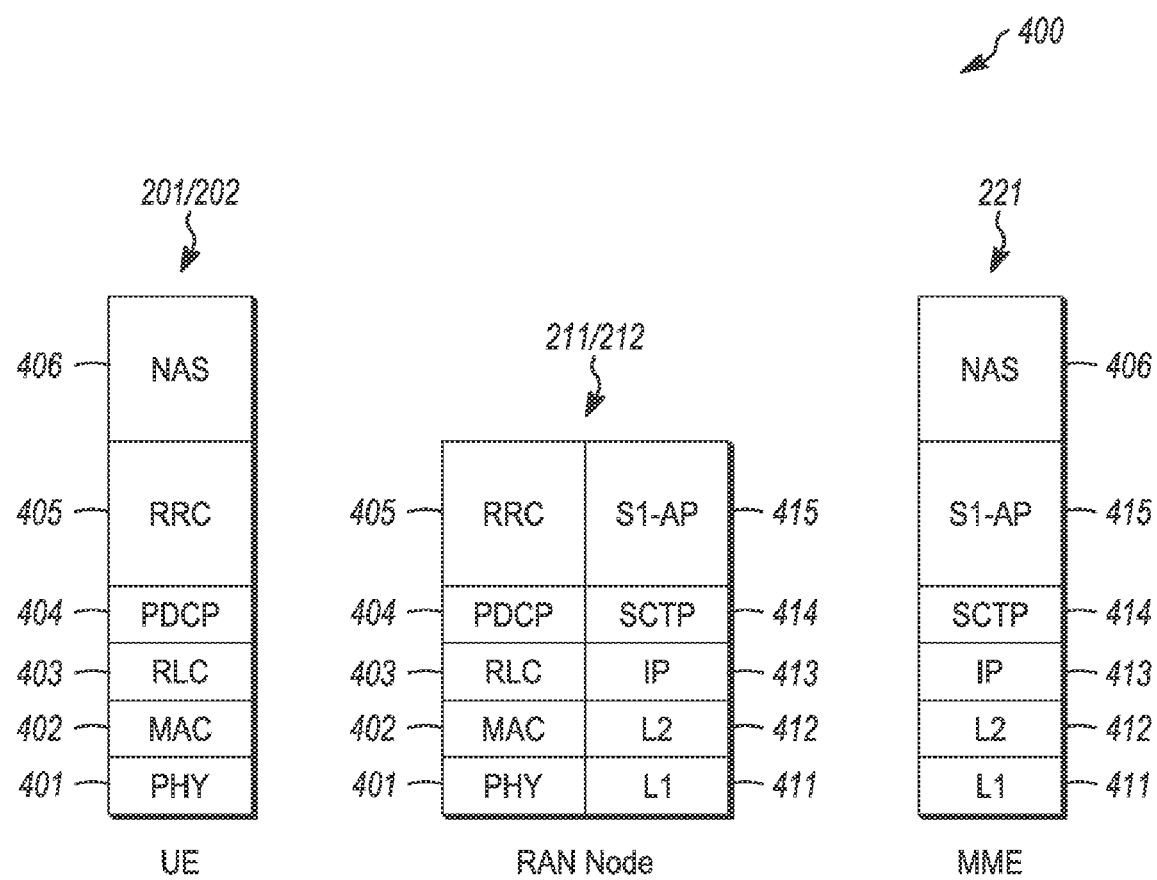
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM). Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g, included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The St Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups' UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
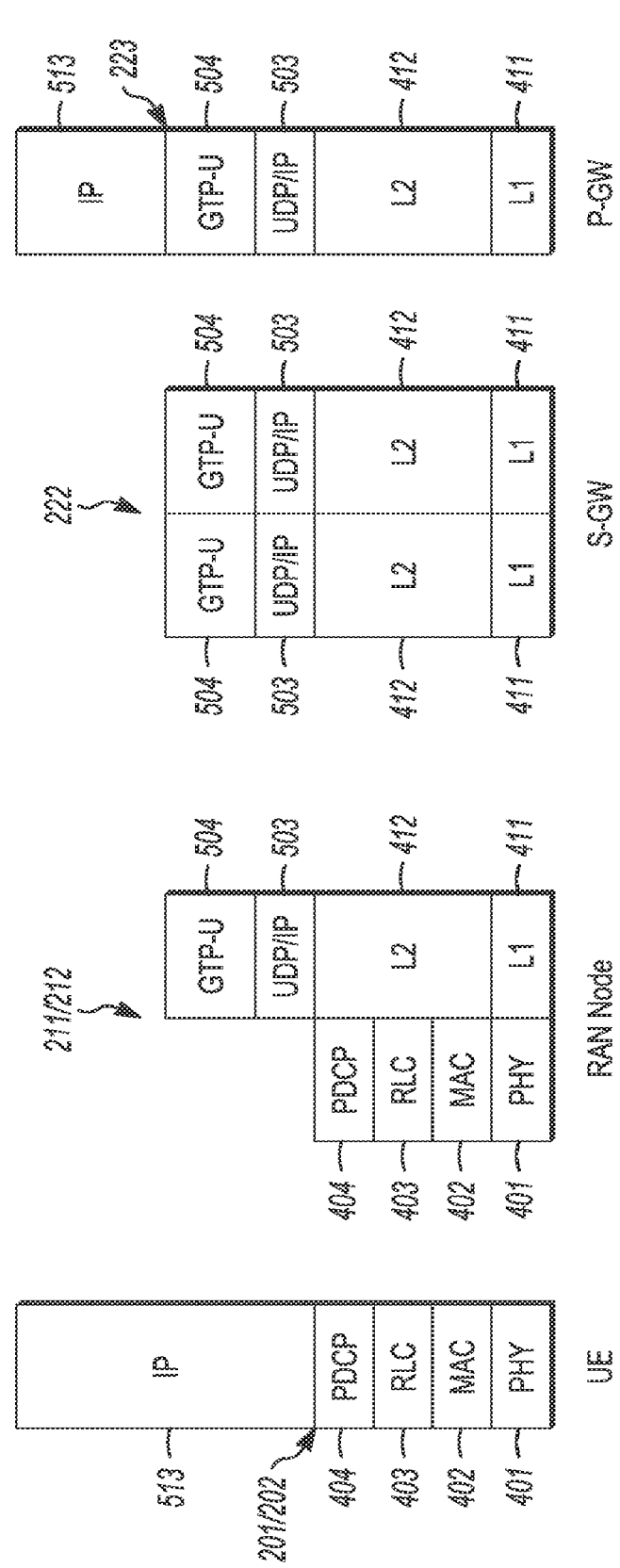
FIG. 5 is an illustration of a user plane protocol stack m accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
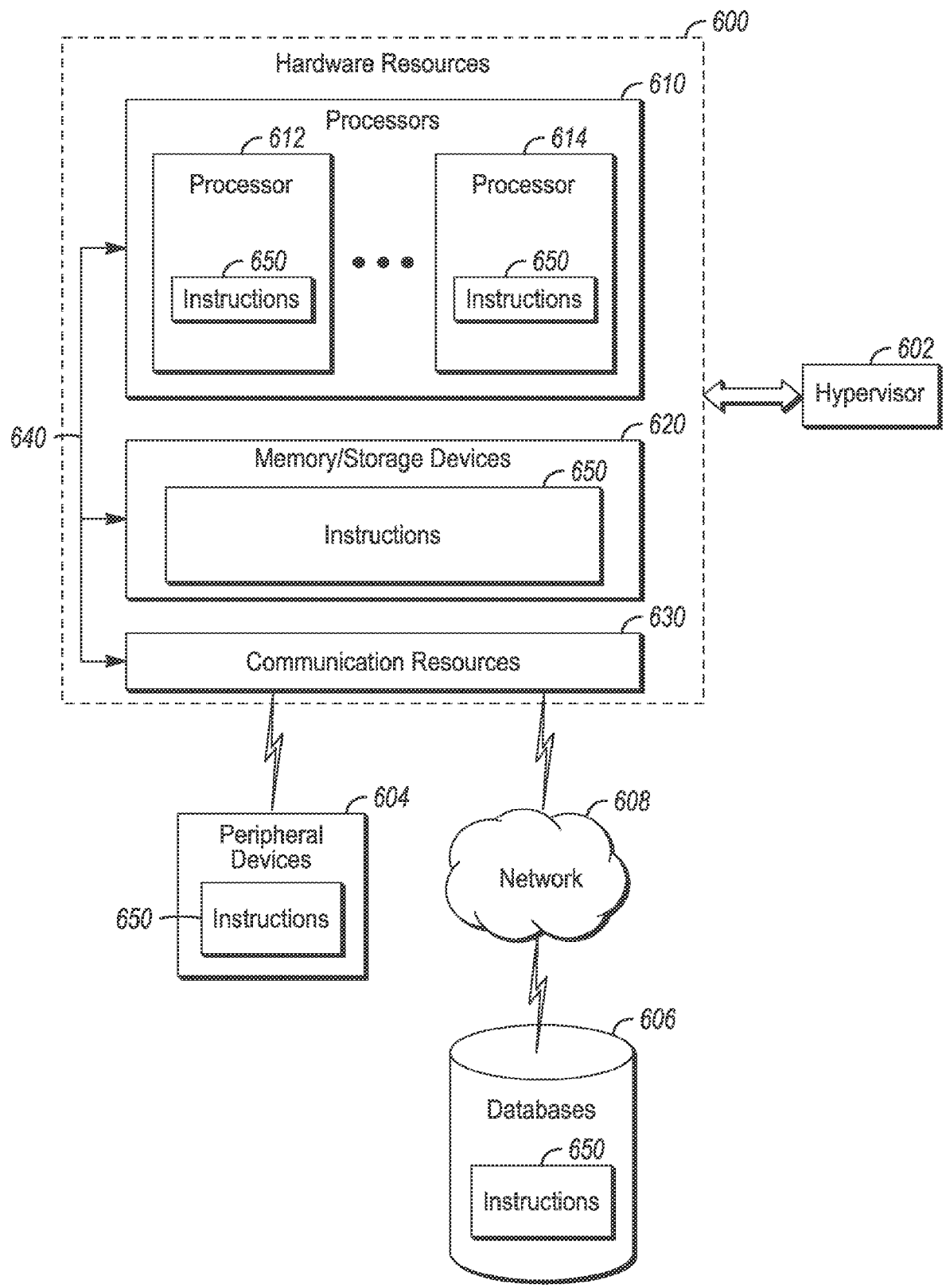
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically. FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620) may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. In some embodiments, the instructions 650 may reside on a tangible, non-volatile communication device readable medium, which may include a single medium or multiple media. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
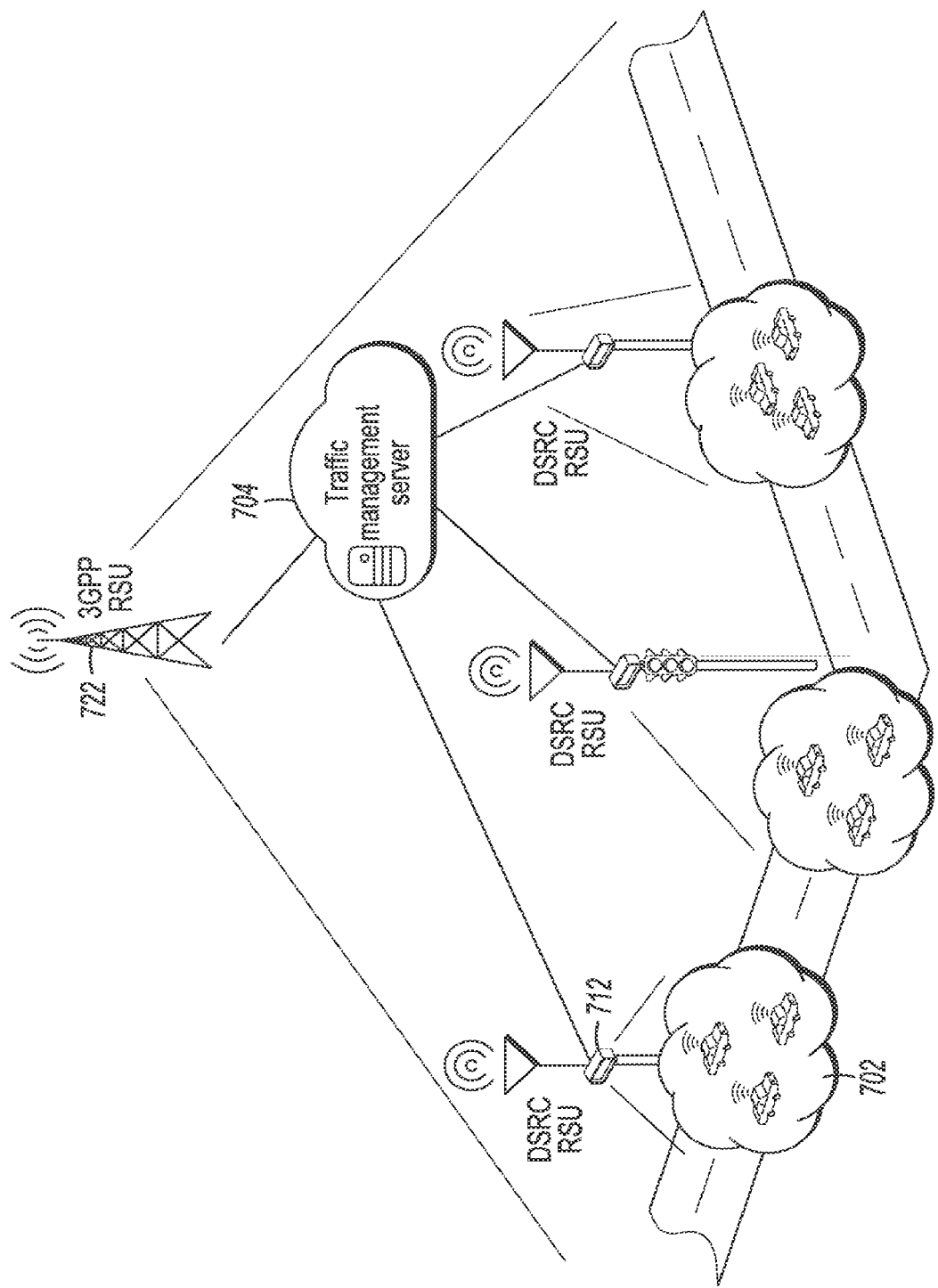
FIG. 7 illustrates an Intelligent Transportation System (ITS) in accordance with some embodiments.

As described above, vehicle UEs may engage in V2X communications. V2X communications may be part of a ne2 generation Intelligent Transportation System (ITS) that is to be designed to take into account the massive influx of low-data, high-delay and low power transmissions. FIG. 7 illustrates an Intelligent Transportation System (ITS) 700 in accordance with some embodiments. There may be multiple radio access technologies (RAT) available for communications by V2X UEs 702, such as those in FIGS. 1-6. V2X UEs 702 (also called on-board units or OBUs) may be equipped with a range of multiple access technologies for V2X communications, using protocols such as Dedicated Short Range Communication (DSRC), LTE, and 5G (also called new radio (NR)), each of which may be direct or network-mediated communication between OBUs 702. The DSRC suite of protocols is based on the IEEE 802.11 standards, adding modifications to the exchange of safety messages between vehicles and vehicles and road side units (RSUs) 712,722.

The types of communications in the ITS 700 may include Vehicle-to-Vehicle (V2V) communications, Vehicle-to-Infrastructure (V2I) communications, Vehicle-to-Network (V2N) communications and Vehicle-to-Pedestrian (V2P) communications. The communications may occur over a PC5 reference point. V2X applications in the V2X UEs 702 may communicate with other vehicle-based V2X applications (V2V communications), V2I communications may involve communications with a RSU 712,722 and V2N communications may involve communications with an eNB (or E-UTRAN) to provide various V2X services. The communications among OBUs 702 may be coordinated by a traffic management server 704.

ITS applications may rely on the concept of situation or co-operative awareness, which is based on periodic and event-driven broadcast of basic safety messages (BSM) for V2V, V2I and V2P transmissions. Such transmissions may thus be based on primarily broadcast capability between vehicles or between vehicles and vulnerable road users (e.g., pedestrian, cyclist). The transmissions may, for example, provide information about location, velocity and direction, which may be used to avoid accidents. The short messages (BSM) may be useful locally to identify situations that require action (e.g, collision warning, emergency stop, pre-crash warning, etc.) within very short intervals (e.g. 20 to 100 msec). As such, minimizing the overhead involved in enabling scalable transmission and reception of BSMs is one of the challenges to support V2X (V2V, V2I and V2P) over cellular systems. Broadcasts, however, are not the only transmissions between the OBUs 702; unicast messages may also be communicated between the various OBUs 702.

V2I transmission may be provided between a vehicle and UE (RSU). V2N transmission may be between a vehicle and a V2X application server. A V2X Application Server may be able to support multiple V2X applications. A RSU may be used to e2end the range of a V2X message received from a vehicle by acting as a forwarding node (e.g., repeater). V2I may include communication between vehicles and traffic control devices, such as in the vicinity of road work. V2N may also include communication between vehicle and the server via the 4G/5G network, such as for traffic operations. Thus, an RSU may support V2I service that can transmit to, and receive from a UE using V2I applications. In various embodiments, the RSU 712, 722 may be implemented in an eNB or a stationary UE and may contain some or all of the components shown in FIGS. 2-6. The RSU may rebroadcast V2X messages for other vehicles (V2V), pedestrians (V2P), or various networks systems (V2I) using a multimedia broadcast multicast service (MBMS) for LTE as described, for example, in 3GPP TR 23.785 entitled study on architecture enhancements for LTE support of V2X services V1.0.0 (SP-160321) published on Jun. 15, 2016.

To support communications the RSU may include a V2X application server integrated with an eNB. The RSU may in some embodiments also additional network components, such as a local gateway (LGW) and a multimedia broadcast multicast service gateway (MBMS-GW) coupled to a mobility management entity (MME) and the evolved universal mobile telecommunications system (UMTS) terrestrial radio access (E-UTRAN) systems and that connects to a broadcast multicast service center (BM-SC).

The V2X communications may be generally bidirectional, e.g., V2I and V2N also involve the infrastructure sending messages to the vehicles. The UE may obtain authorization to use V2X communications over the PC5 reference point on a per public land mobile network (PLMN) basis in the serving PLMN by a V2X Control Function in the Home PLMN (HPLMN) through a V3 reference point. The V2X Control Function may be connected with the HSS over a V4 interface. The HSS may be connected with the EPC. The V2X Control Function may request authorization information from a V2X Control Function of the serving PLMN. The V2X Control Function in the HPLMN may combine authorization information from the home and serving PLMNs. Authorization may be revoked at any point by either V2X Control Function. The V2X Control Function may communicate the combined authorization information to the OBU 702 and/or revocation.

The PC5 reference point may be used to provision the OBU 702 with various pieces of information for V2X communications. This information may include the authorization policy, radio parameters and policy/parameters for V2X communication. The authorization policy may indicate PLMNs in which the OBU 702 is authorized to perform V2X communications over the PC5 reference point when served by the E-UTRAN and otherwise whether the OBU 702 is authorized to perform V2X communications over the PC5 reference point (i.e., when not served by the E-UTRAN). The radio parameters may include those in a particular geographical area to be configured in the OBU 702 to be able perform V2X communications over the PC5 reference point when not served by E-UTRAN. The policy/parameters may include the mapping of Destination Layer-2 ID(s) and the V2X services, e.g. PSID or ITS-AIDs of the V2X application, as well as the mapping of ProSe per-packet priority and delay budget for V2X communication. Additional information may be provisioned to the OBU 702 regarding V2X communications over the LTE-Uu reference point between the OBU 702 and the E-UTRAN.

As above, a OBU 702 may be equipped with multiple transceivers each operating in a different spectrum band (or a selectable transceiver). However, interoperability issues may exist in an ITS, both as different OBUs 702 may be able to communicate (due to limited multi-modes being able to be supported) on only some of the RATs to be used in the ITS, which may be dependent on the choice of operator, and due to the difficulties between different protocols, leading to communication issues between RSUs 712, 722. In particular, while the cellular (e.g. LTE or 5G) protocols defined in 3GPP are currently being enhanced to support V2X communications and meet key performance indicators (KPIs), such as latency and data rate, the different types of RSUs 712, 722 may not be communicate due to the use of different protocols, making communication between the RSUs 712, 722 difficult. This interoperability among RSU may further delay handover of V2X services, if desirable.

The description herein may refer primarily to unicast message transmission between the network and a mobile multi-mode OBU 702. When the OBU 702 is in DSRC coverage, the OBU 702 is able to send to and receive data from a DSRC RSU 712; when the OBU 702 is in 5G coverage, the OBU 702 is able to send to and receive data from a cellular RSU 722. A multi-mode OBU, such as OBU 702, may be able to support 5G. LTE. DSRC RATs when in 5G/LTE coverage and no coverage in DSRC and currently is receiving V2X services on 5G/LTE. Unfortunately, due to the aforementioned interoperability issues between protocols, as the OBU 702 moves from cellular coverage towards DSRC coverage, the network may be unable to determine that the OBU 702 is entering DSRC coverage and/or make handover decisions based on RSU characteristics or loading. The consequence of this is that the cellular RSU 722 may be unable to offload any V2X services for the OBU 702 to the DSRC 712 in a timely manner. In some embodiments, even after this information is provided and some of the V2X services offloaded to the DSRC RSU 712, the OBU 702 may continue to camp on the cellular RSU 722. A similar symmetric issue may also arise when the OBU 702 transitions from DSRC coverage to cellular coverage (no DSRC coverage).

In addition to areas of no coverage overlap, in some situations, multiple types of coverage areas may overlap. In this case, as the OBU 702 moves between cellular (3GPP-LTE, 5G) and DSRC coverage areas, the networks may wish to direct devices among the different RATs to, for example, ensure proper load balancing. Additionally, the OBU 702 may move from an area of no DSRC coverage to an area of DSRC coverage while V2X communication is taking place using a 3GPP RAT. In this use case, the 3GPP RAT may, wish to offload V2X communication soon after the OBU 702 enters the DSRC coverage area, as determined by GPS or other location determination techniques. In these situations, 5G/LTE networks may trigger a V2X offload procedure using one or more RRC or NAS messages from the LTE/5G RSU 722 to the OBU 702. The RRC message may indicate which V2X services are in operation for the OBU 702. The V2X offload procedure may indicate to start using the V2X services from the DSRC RSUs 712. Similarly, the DSRC RSU 712 may determine that some of the V2X services are to be offloaded In this case, the DSRC RSU 712 may transmit an offload message using a V2X WME so that the OBU 702 starts to receive the V2X services from the LTE/5G RAT RSU 722.

Figures 8A, 8B:
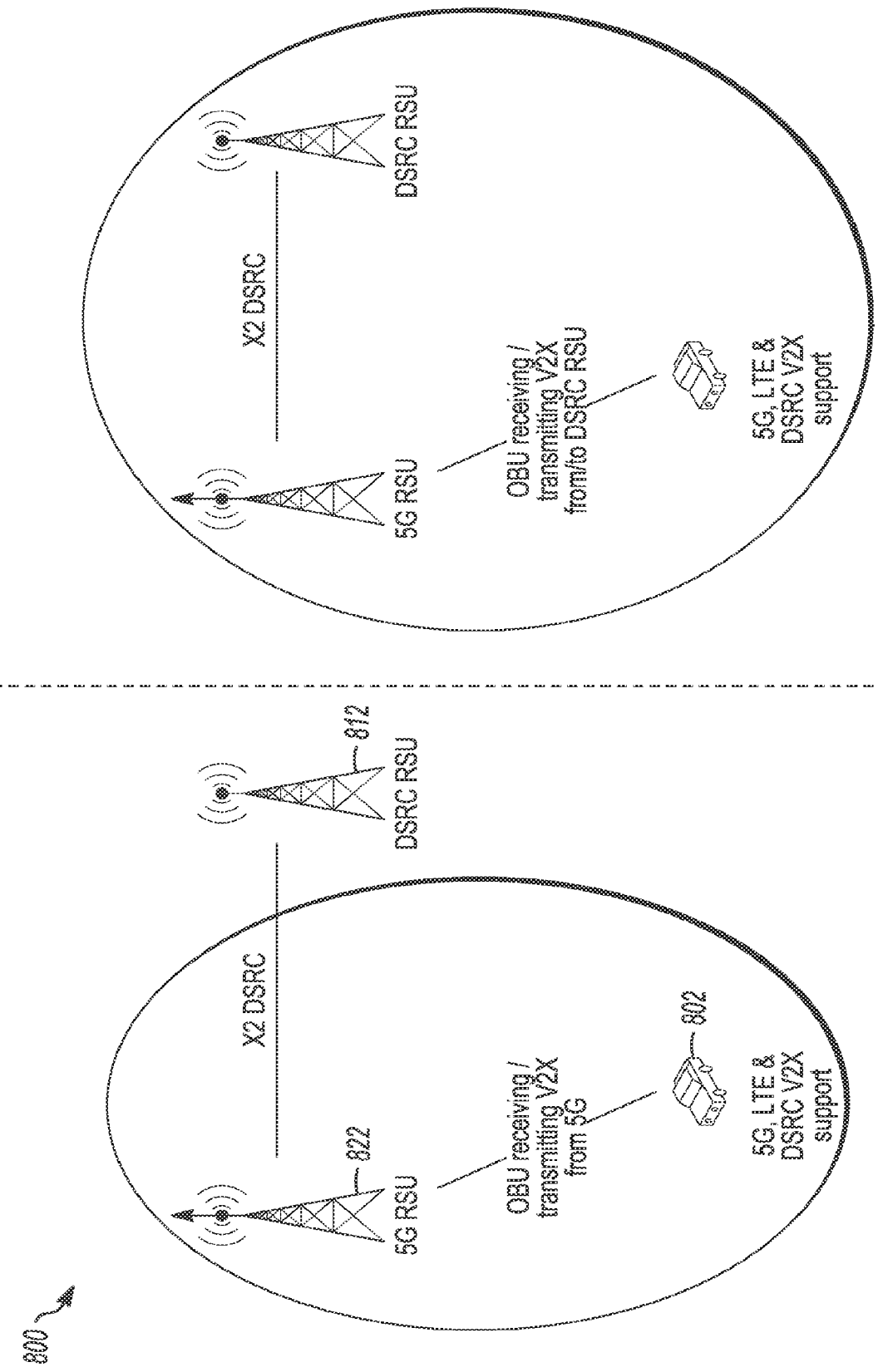
FIG. 8A illustrates an ITS prior to offloading according to some embodiments.
FIG. 8B, which illustrates an ITS after offloading according to some embodiments.
Figure 9:
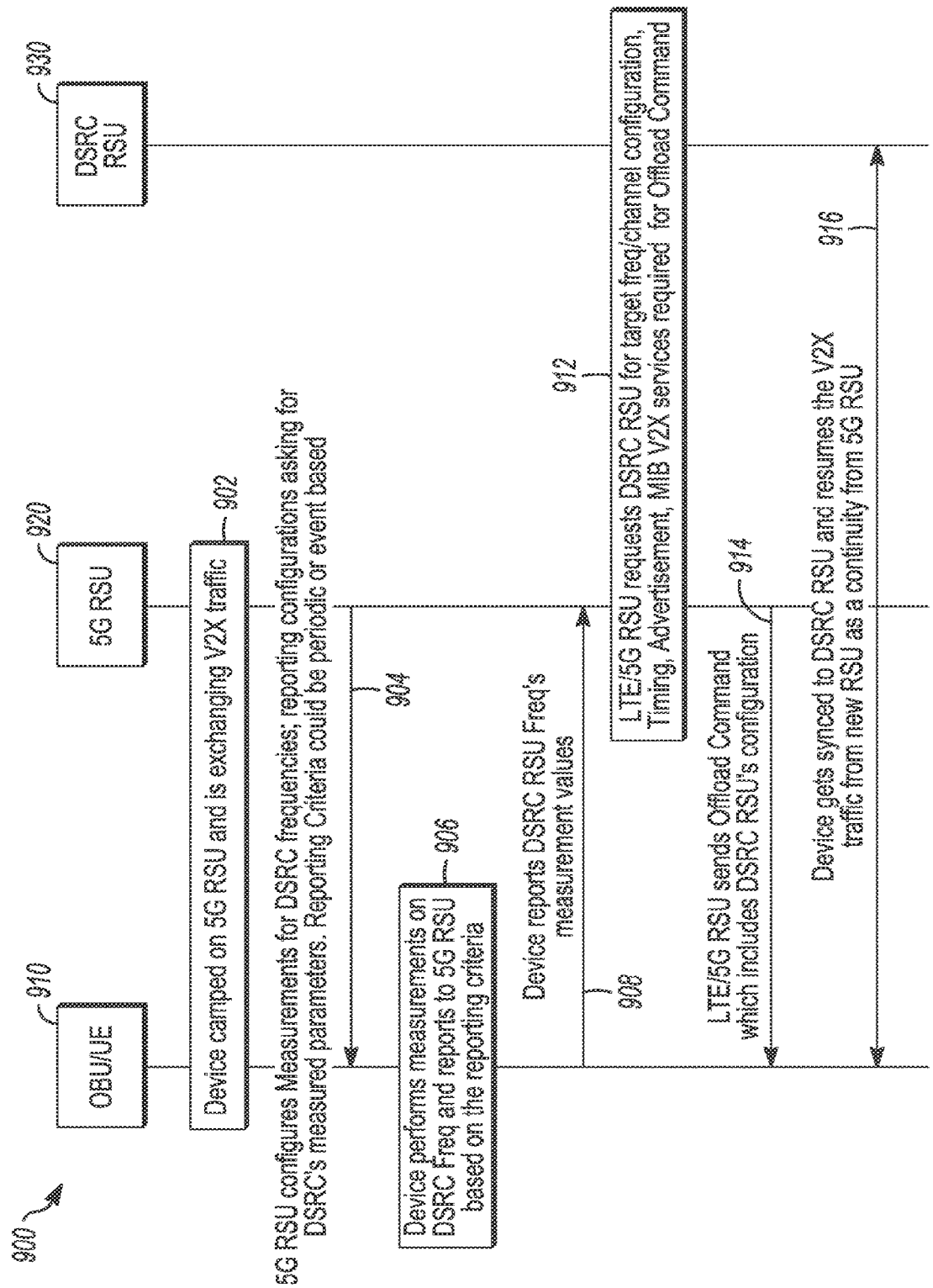
FIG. 9 illustrates a message flow according to some embodiments.

This is shown in FIG. 8A, which illustrates an ITS prior to offloading according to some embodiments, and FIG. 8B, which illustrates an ITS after offloading according to some embodiments. FIG. 9 illustrates a message flow according to some embodiments. As illustrated FIGS. 8A and 8B may include an ITS 800 that includes both a DSRC RSU 812 and a cellular RSU 822. The message flow 900) may be among the DSRC RSU 812, the cellular RSU 822, and the OBU 802 shown in FIGS. 8A and 8B. In FIG. 8A, an OBU 802 may be camped on the cellular (5G/LTE) RSU 822. Likewise, the message flow 900 of FIG. 9 shows the OBU 910 camped on a 5G RSU 920 at operation 902. The OBU 910 may receive and/or transmit V2X data with the cellular RSU 920. Here, as throughout this description, each of the various devices may encode data for transmission as used by the particular protocol and may similarly decode received data from another of the devices. At this point, the OBU 910, although capable of receiving signals from both the cellular RSU 920 and the DSRC RSU 930, may not have DSRC coverage and thus may perform measurements on the cellular RSU 920 and provide the measurements to the cellular RSU 920.

As shown in FIGS. 8A and 8B, the DSRC RSU 812 and the cellular RSU 822 may be connected through an X2 backbone. The DSRC RSU 812 may provide information to the cellular RSU 822 such as DSRC RSU capability and loading, among others In other embodiments, the source RAT (in this case the cellular RSU 822) may be able to obtain the information of the target RAT (in this case the DSRC RSU 812) used for offloading via one of a number of methods, including via a RAN IF, a core network entity, or a V2X function.

Eventually, the OBU 910 may reach an area in which DSRC coverage is available, in addition to remaining camped on the cellular RSU 920. As shown in FIG. 9, the cellular RSU 920 may configure the OBU 910 for measurements at DRSC frequencies over which the DSRC RSU 930 communicates at operation 904. This may permit the OBU 910 to scan for particular control or data signals either continuously or at predetermined intervals at the indicated frequencies. The message may include the Wireless Access in Vehicular Environment (WAVE) Basic Service Set (BSS) ID of the DSRC RSU 930.

The DRSC information may have been provided to the cellular RSU 920 from the DSRC RSU 930 over the X2 backbone. In some embodiments, the cellular and DSRC RSUs may operate over entirely different frequency ranges. The cellular RSU 920 may configure the OBU 910 with the channel(s) to measure including one or more of the DSRC channel type (e.g., Control Channel (CCH)/Shared Channel (SCH)) and/or channel number. In addition, the cellular RSU 920 may configure the OBU 910 for the type of measurement, which may be selected from one or more of received signal strength indicator (RSSI), signal-to-noise ratio (SNR), signal-to-interference ratio (SIR), or signal-to-interference-plus-noise ratio (SINR), among others. The cellular RSU 920 may configure the OBU 910 regarding how often to perform the measurement in a predetermined time period (e.g., a single frame), e.g., a single occasion or periodically at specific intervals. When multiple measurements are performed on different DSRC channels, the type of measurement and/or periodicity may vary among the DSRC channels. In some cases, the measurements of each DSRC channel may be independent of each other DSRC channel in some embodiments, the measurements taken in at least some of the DSRC channels may be interdependent—either the same type and/or periodicity or complementary (e.g., same periodicity but different type when the DSRC channels fulfill a particular relationship to each other).

The configuration of the OBU 910 by the cellular RSU 920 may occur when the OBU 910 is determined to have reached the DSRC coverage area (by the location information) or may occur prior to the OBU 910 entering to the DSRC coverage area, for example, which may be estimated by the cellular RSU 920 or network based on the OBU location, speed and direction. In addition to the measurement configuration, the cellular RSU 920 may provide a reporting configuration for the DSRC RSU 930 to the OBU 910 in the same or a different RRC message. This may permit the OBU 910 to avoid other reports to the cellular RSU 920 from other OBUs. The reporting may be periodic (i.e., time dependent) or event-driven, i.e., a particular measured signal (such as RSSI) reaching a predetermined threshold. The event-driven threshold may be based on the V2X services being rendered by the cellular RSU 920.

The OBU 910 may perform measurements on signals reference (or other predetermined data and/or control signals) from the DSRC RSU 930 at operation 906, in addition to those of the cellular RSU 920. As above, the measurements and reporting of signals of the DSRC RSU 930 may be performed in accordance with the information provided to the OBU 910 in operation 904. The OBU 910 may thus periodically scan to monitor DSRC activity on various channels, such as control and service channels.

At operation 908, the OBU 910 may report the DSRC measurements to the cellular RSU 920. The OBU 910 may send the information about the presence of DSRC activity (as RSSI report for example) to the cellular RSU 920 as a measurement report. The cellular RSU 920 may use this information to allocate radio resources for the OBU 910. The OBU 910 may generate the report contemporaneously with the measurement, in a dynamic fashion so that each measurement is reported individually, or may aggregate the measurements until a predetermined event occurs in a log file and transmit the log file when the predetermined event occurs Whether the measurement is reported individually or aggregated in a log file, the predetermined event may be a predetermined time period expiring (which resets after transmission of the log file), a predetermined number of measurements is performed and/or a particular measurement on any or one or more specific DSRC channels reaching a predetermined threshold (which may be different for the different DSRC channels), among others.

In some embodiments, the OBU 910 may not be attached to the DSRC RSU 930 and thus the DSRC measurements may be provided from the OBU 910 to the cellular RSU 920. The OBU 910 may also provide the cellular RSU 920 with the location of the OBU 910 when the measurement was taken, as well as the time when the measurement was taken. The OBU 910 may, for example, transmit OPS or other location-based measurements to the cellular RSU 920. The OBU 910 may calculate the OBU location based on measurements taken by the OBU 910 and send the OBU location to the cellular RSU 920, or may transmit the measurements to the cellular RSU 920 for the cellular RSU 920 or network entity to determine the OBU location.

The cellular RSU 920 may determine, based on the OBU location, and/or other information, such as load balancing and/or measurement reports, whether offloading of the ongoing V2X service for the OBU 910 is appropriate. With regard to the loading of the different RSUs, the cellular RSU 920 may make such a determination, for example, based on the loading of the cellular RSU 920 alone or the DSRC RSU 930 alone (if the information is available) or may take into the loading of both the cellular RSU 920 and the DSRC RSU 930.

In embodiments in which the OBU 910 is able to be provided V2X service by multiple cellular and/or DSRC RSUs, the loading of all or some of the cellular and DSRC RSUs. For example, the cellular RSU 920 may limit taking into account the loading of DSRC RSUs to only those DSRC RSUs whose (power or other) measurements, as measured by the OBU 910, are above a minimum threshold and that are able to provide the V2X service. In some cases, a particular DSRC RSU may be unable to provide the desired V2X service, in which case the cellular RSU 920 may avoid offloading the V2X service to the particular DSRC RSU. Similarly, the cellular RSU 920 may determine to which DSRC RSU (or even whether) to offload the V2X service, if multiple DSRC RSUs are able to adequately provide the V2X service. For example, the cellular RSU 920 may determine to which DSRC RSU to offload the V2X service based on a comparison of the loading of the DSRC RSUs.

At operation 912, the cellular DSRC RSU 920 may request offloading information from the DSRC RSU 930. The information may include various parameters used to provide V2X and other services. These parameters may include frequency and channel configurations for the DSRC RSU 930, timing advertisement, and master information block (MIB) for the V2X services to be offloaded using the Offload Command. The cellular DSRC RSU 920 may identify the V2X services to be offloaded using a provider service identifier (PSID) for each of V2X services. In some embodiments, operation 912 may be performed by the cellular DSRC RSU 920 in response to making the determination to offload the V2X services to obtain the most recent DSRC parameters. In some embodiments, operation 912 may be performed before the reporting of operation 908. In some embodiments, operation 912 may be avoided if, for example, the cellular DSRC RSU 920 has performed the same operation for a different OBU 910 within a predetermined time period.

In some embodiments, the DSRC RSU 930, during operation 912, may determine whether one or more of the V2X services are accepted and indicate this to the cellular DSRC RSU 920. In some embodiments, the DSRC RSU 930 may not support some of the V2X services to be offloaded or may limit the offloading due to load balancing issues itself. In some embodiments, the DSRC RSU 930 may merely accept the offloaded V2X services without an indication of acceptance being provided to the cellular DSRC RSU 920.

In some embodiments, after making a determination to offload the V2X service, the cellular DSRC RSU 920 may send at operation 914 a control message to the OBU 910 through the cellular RSU 920. In some embodiments, the control message may be, for example, an RRC message. The control message may instruct the OBU 910 that the ongoing V2X service is going to be or has been offloaded to the nearby DSRC RSU 930. In the former case, the control message may indicate the time when the offloading is to occur. The offload command may include parameters such as the DSRC frequency and CCH/SCH information. Timing Advertisement, MIB, and others.

In response to reception and decoding of the control message that contains the offload command, the OBU 910 may synchronize to the DSRC RSU 930 at operation 916. After synchronization, the OBU 910 may continue to communicate the V2X traffic, which had been communicated via the cellular DSRC RSU 920, using the DSRC RSU 930.

In addition to offloading, shared spectrum (e.g., in the 5.9 GHz band) between DSRC technology and 3GPP V2X technologies may be used by a variety of co-existing V2X UEs, including DSRC only V2X UEs and multi-mode V2X UEs (which may use DSRC, 3GPP LTE, 3GPP 5G frequencies). The network (an eNB or cellular RSU) may control and coordinate measurements on DSRC channels as well as reporting formats and modes for multi-mode UEs.

As described, in some embodiments above, the multi-mode V2X UE may periodically scan to monitor the DSRC activity on the control and service channels. The multi-mode V2X UE may send the information about the presence of DSRC activity (as RSSI report, for example) to the cellular RSU, an eNB or another V2X UE as a measurement report. The eNB, for example, may use the measurement information to efficiently allocate radio resources for 3GPP UEs.

In some embodiments, the measurement may be sent in a sidelink buffer status report (BSR) MAC control element in a MAC PDU. In some embodiments, the measurement may be sent in a DSRC MAC control element. The BSR MAC PDU may include parameters of DSRC activity in the range of the V2X UE. The information sent from V2X UE to the network for channel allocation may include the Logical Channel Group ID (LCG ID) and Buffer Size. The LCG ID may identify the group of logical channel(s) for which buffer status is being reported. The length of the field may be, for example, 2 bits. The Buffer Size field may identify the total amount of data available across all logical channels of a LCG alter all MAC PDUs for the transmission time interval (TTI) have been built. The amount of data may be indicated in number of bytes. The length of this field may be, for example, 6 bits.

In addition, either the BSR or the DSRC MAC control element may further include one or more of DSRC Presence, CCH measurements or SCH measurements. The DSRC Presence may indicate active DSRC communication in the multi-mode UE range. The DSRC Presence may be a single bit, binary value—e.g., set to '0' to indicate no DSRC activity and '1' to indicate DSRC activity. The CCH measurements may be measurements of the CCH, which is used for safety messages. As above, the CCH measurement may be RSSI, SNR, SIR and/or SNIR. The SCH measurements (SCH1 . . . SCHn), which may be measurements of a service channel, may be used for both safety and non-safety messages. The SCH measurement may be RSSI, SNR, SIR and/or SNIR and may be independent of the CCH measurements.

Other fields may, of course, be added In some embodiments, the V2X UE can choose whether to include the CCH and SCH measurements based on the value in DSRC presence parameter. If the DSRC presence is set to 1, the V2X UE may include the CCH measurements m the report and if set to (may omit the CCH measurements report. Alternatively, in some embodiments, irrespective of the value of the DSRC presence, the V2X UE may include the CCH measurement if the transmit power level measured on CCH is above a predetermined threshold configured in the V2X UE.

In some embodiments, a legacy RRC measurement report may be used to provide intra-frequency measurements and inter-frequency measurements as indicated in 3GPP TS 36.331. The V2X UE may be further configured to report DSRC measurements in response to a determination that the V2X UE is V2X capable. The information sent from the V2X UE to the cellular RSU may be the same as above: DSRC Presence. CCH measurements or SCH measurements.

In a manner similar to operation 908, the measurements may be reported in a dynamic fashion or stored locally and then uploaded in response to a predetermined event. One such event may be that the cellular RSU requests the measurements. The measurements can be accompanied with a date and time stamp, so that the network operator can generate a map of the channel utilization based on date and times. This may also facilitate channel allocation in a coarser manner. For example, channels that are under-utilized in an area can be the first ones to be measured.

In addition, the measurements also facilitate 3GPP RSU deployment plans as the operators can learn where there is a lack of DSRC RSU coverage. Operators may then use this information to arrange additional DSRC RSUs or cellular RSUs (or adjust existing cellular RSUs to adjust the coverage provided).

In some embodiments, the cellular RSU may configure the V2X UE for performing and reporting measurements as indicated above. These parameters may include DSRC channel type and/or channel number, channel to measure, measurement type (e.g., RSSI, SIR, SNR. SINR), measurement frequency (e.g., once or periodically), and/or measurement period. Reporting measurement parameters may include report type, e.g., Dynamic/Instantaneous or in a log file (aggregate measurements) If dynamic/instantaneous, other parameters may be added, such as when to report: once, periodically or event based (such as when the measurement reaches or exceeds a predetermined report threshold). If in a log file, other parameters may be added, such as the V2X UE location when the measurement was performed (latitude and longitude) and date and time. If log file, additionally, the parameters may indicate when to upload the file to the network, such as event based (a given number of measurements is performed), periodic, or upon request from the network.

Figure 10:
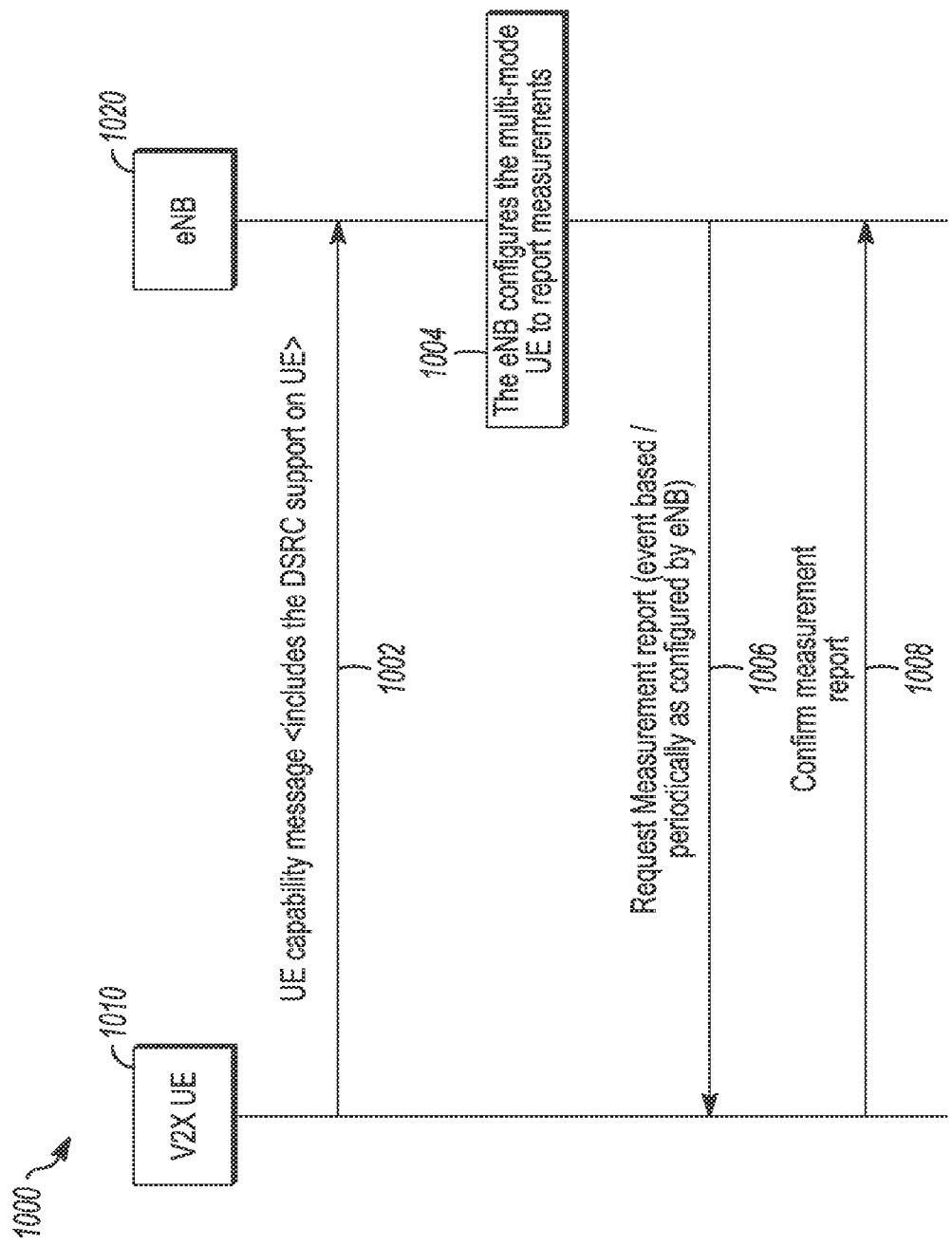
FIG. 10 illustrates a measurement report flow according to some embodiments.

FIG. 10 illustrates a measurement report flow according to some embodiments. The measurement report flow 1000 includes a multi-mode (LTE/5G, DSRC) V2X UE 1010 and an eNB 1020, such as those shown and described above. The message flow 1000 for initiating and notification of measurement report may start at operation 1002 with the V2X UE 1010 providing to the eNB 1020 an indication of the UE capacity. The UE capacity message 1002 may include the DSRC support Information.

At operation 1004, the eNB 1020 may configure the V2X IUE 1010 to report DSRC activity measurements. The configuration data may include the performance measurements indicated above. The list of performance measurements is not complete, other fields may be added. The messages between the eNB 1020 and the V2X UE 1010 (which may include an acknowledgement from the V2X UE 1010) are not shown here for convenience.

At operation 1006, the eNB 1020 may determine that a measurement report from the V2X UE 1010 is desired In response to the determination the eNB 1020 may send a measurement report request to the V2X UE 1010.

At operation 1008, the V2X UE 1010 may receive the request. In response to the request, the V2X UE 1010 may generate the report from the stored file and transmit the report in a measurement report confirmation to the eNB 1020.

Figure 11:
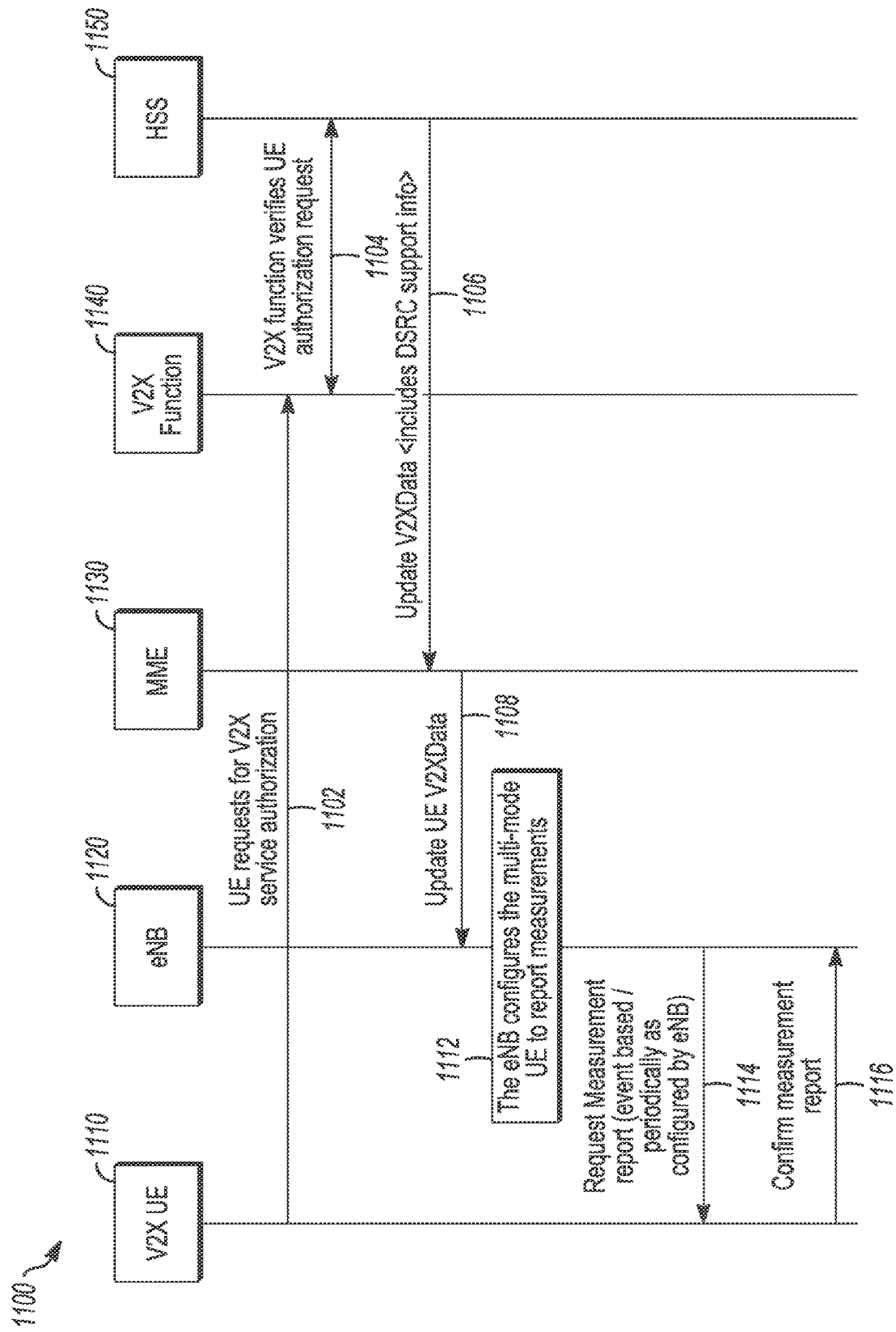
FIG. 11 illustrates a measurement report flow according to some embodiments.

FIG. 11 illustrates a measurement report flow according to some embodiments. The measurement report flow 1100 includes a multi-mode (LTE/5G, DSRC) V2X UE 1110, an eNB 1120, a MME 1130, a V2X function 1140 and a HSS 1150. The V2X function 1140 is part of the V2X architecture defined in SA2. The devices shown may be similar to those described above. Unlike the message flow 1000 shown in FIG. 10, the message flow 1100 for initiating and notification of measurement report in FIG. 11 may use a V2X authorization request at operation 1102. Specifically, the V2X UE 1110 may send a V2X authorization request 1102 to the V2X function 1140.

At operation 1104, the V2X function 1140 may verify subscription information for the requested V2X service. In particular, the V2X function 1140 may communicate with the HSS 1050 to verify the subscription information. The V2X function 1140 may transmit a request for verification to the HSS 1150: the request may contain the PSID of the V2X service as well as the V2X ID.

At operation 1106, the HSS 1150 may respond not to the V2X function 1140 but to the MME 1130. Specifically, the HSS 1150 may respond by sending the V2X data information update to the MME 1130. The V2X data information update may include the DSRC support information indicated above.

At operation 1108, the MME 1130 may communicate with the eNB 1120. In particular, the MME 1130 may update the eNB 1120 with information about the V2X service that the V2X UE 1010 is authorized to use. The update may include the DSRC capability of the V2X UE 1010.

At operation 1112, the eNB 1120 may configures the V2X UE 1010 to report measurements. The configuration data may include the performance measurements above. The list of performance measurements may include other fields in addition to those discussed above. The messages may also be similar to those described above.

At operation 1106, the eNB 1120 may determine that a measurement report from the V2X UE 1110 is desired. In response to the determination the eNB 1120 may send a measurement report request to the V2X UE 1110.

At operation 1108, the V2X UE 1110 may receive the request. In response to the request, the V2X UE 1110 may generate the report from the stored file and transmit the report in a measurement report confirmation to the eNB 1120.

Thus, the RAN node (e.g., eNB) may be configured as a RSU (cellular RSU) and may send and receive V2X messages to and from a V2X UE. The cellular RSU may be able to detect if the V2X UE is able to receive messages from a nearby DSRC RSU (near to the V2X UE and the cellular RSU). The ability to detect if the V2X UE is able to receive messages from the nearby DSRC RSU may be based on reports received from the V2X UE. The reports may contain one or more of a list of DSRC RSUs that the UE can listen to, power level of the signals received from the DSRC RSUs, channel load of the DSRC RSUs. Based on the measurements, the cellular RSU may decide to offload the V2X traffic to the DSRC RSU. The cellular RSU may then send a message to the V2X UE triggering the V2X UE to start receiving and transmitting the V2X services from the DSRC RSU. The message to the V2X UE may be an RRC or Non-Access Stratum (NAS) message. The message to the V2X UE may contain the WBSS of the DSRC RSU.

The V2X UE may be multi-mode, and thus capable of operating in DSRC and 3GPP RAN channels allocated for V2X communications. The V2X UE may collect and transmit DSRC channel measurements over at least one 3GPP RAN interface under control of the 3GPP network. The V2X UE may receive authorization and DSRC measurement configuration information from a 3GPP RAN node. The V2X UE may report measurements m one or more of: a BSR MAC control element, a DSRC MAC control element or a RRC measurement report. The measurement report sent to the 3GPP RAN node may include a combination of DSRC presence fields, CCH measurements and SCH measurements. The CCH and SCH measurements may include RSSI, SNR, SIR or SNIR. The V2X UE may send measurement reports periodically, when triggered by an event, or when requested by the network. The V2X UE may log measurements in local storage and send a report including a set of measurements. The V2X UE may associate a timestamp and current location to each measurement in an aggregate measurement log file.

EXAMPLES

Example 1 is an apparatus of a cellular roadside unit (RSU), the apparatus comprising, at least one interface to communicate with a vehicle-to-anything (V2X) user equipment (V2X UE) and a dedicated short range communication (DSRC) RSU; and processing circuitry in communication with the interface and arranged to: encode data of a V2X service for transmission to the V2X UE on a cellular frequency band: encode DSRC measurement information for transmission to the V2X UE through the interface, the DSRC measurement information comprising parameters for measurement of DSRC frequency band signals from the DSRC RSU by the V2X UE; decode DSRC measurements from the V2X UE based on the DSRC measurement information; determine whether to offload the V2X service to the DSRC RSU based on the DSRC measurements; in response to a determination to offload the V2X service to the DSRC RSU, communicate offloading information with the DSRC RSU, the offloading information indicating offloading of the V2X service from the cellular RSU to the DSRC RSU: and after communication of the offloading information, encode an offload command for transmission to the V2X UE through the interface, the offload command comprising an indication of offloading of the V2X service from the cellular RSU to the DSRC RSU.

In Example 2, the subject matter of Example 1 includes, wherein: the DSRC measurement information comprises DSRC frequencies and parameters indicating timing for measurement by the V2X UE at the DSRC frequencies.

In Example 3, the subject matter of Examples 1-2 includes, wherein: the DSRC measurement information comprises a reporting configuration for reporting of the DSRC measurements to the cellular RSU.

In Example 4, the subject matter of Example 3 includes, wherein: the reporting configuration indicates that the DSRC measurement information is to be reported periodically.

In Example 5, the subject matter of Examples 3-4 includes, wherein, the reporting configuration indicates that the DSRC measurement information is event-driven.

In Example 6, the subject matter of Examples 3-5 includes, wherein: the reporting configuration indicates that individual measurements of the DSRC measurement information are to be reported individually.

In Example 7, the subject matter of Examples 3-(includes, wherein: the reporting configuration indicates that individual measurements of the DSRC measurement information are to be aggregated into a log file and reported in response to an occurrence of a predetermined event.

In Example 8, the subject matter of Examples 1-7 includes, wherein: the DSRC measurement information comprises at least one of a DSRC channel type, a channel number, a measurement periodicity, or a measurement type.

In Example 9, the subject matter of Example 8 includes, wherein: the DSRC measurement comprises measurements on different DSRC channels, and the measurement type or measurement periodicity of the DSRC channels are independent.

In Example 10, the subject matter of Example 9 includes, wherein: the DSRC measurement comprises at least one of, a list of DSRC RSUs that the V2X UE is able to detect, a power level of each signal received from the DSRC RSUs that the V2X UE is able to detect, or a channel load of each channel of each of the DSRC RSUs that the V2X UE is able to detect.

In Example 11, the subject matter of Examples 1-10 includes, wherein: the offloading information comprises a channel configuration, a frequency configuration, a Timing Advertisement and a master information block (MIB) of the DSRC RSU.

In Example 12, the subject matter of Example 11 includes, wherein, the offloading command comprises the offloading information.

In Example 13, the subject matter of Examples 1-12 includes, wherein: the processing circuitry comprises a baseband processor, and the apparatus further comprises a transceiver configured to communicate with the V2X UE and the DSRC RSU.

Example 14 is an apparatus of a vehicle-to-anything (V2X) user equipment (V2X UE), the apparatus comprising, at least one interface to communicate with a cellular roadside unit (RSU) and a dedicated short range communication (DSRC) RSU; and processing circuitry in communication with the interface and arranged to: decode data of a V2X service from the cellular RSU on a cellular frequency band: decode DSRC measurement information from the cellular RSU, the DSRC measurement information comprising parameters for measurement of DSRC frequency band signals from the DSRC RSU by the V2X UE: encode, for transmission to the cellular RSU through the interface, DSRC measurements based on the DSRC measurement information; and decode a radio resource control (RRC) or Non-Access Stratum (NAS) message from the cellular RSU, the RRC or NAS message comprising an offload command, the offload command triggering the V2X UE to start communicating the V2X service from the DSRC RSU rather than the cellular RSU, the offload command comprising a Wireless Access m Vehicular Environment Basic Service Set (WBSS) identity of the DSRC RSU.

In Example 15, the subject matter of Example 14 includes, wherein: the DSRC measurement information comprises DSRC frequencies and parameters indicating timing for measurement by the V2X UE at the DSRC frequencies.

In Example 16, the subject matter of Examples 14-15 includes, wherein: the DSRC measurement information comprises a reporting configuration that indicates a reporting configuration for reporting of the DSRC measurements to the cellular RSU.

In Example 17, the subject matter of Example 16 includes, wherein: the reporting configuration indicates that individual measurements of the DSRC measurement information are to be aggregated into a log file and reported in response to an occurrence of a predetermined event.

In Example 18, the subject matter of Examples 14-17 includes, wherein, the DSRC measurement information comprises at least one of a DSRC channel type, a channel number, a measurement periodicity, or a measurement type.

In Example 19, the subject matter of Example 18 includes, wherein: the DSRC measurement comprises measurements on different DSRC channels, and the DSRC measurement comprises at least one of: a list of DSRC RSUs that the V2X UE is able to detect, a power level of each signal received from the DSRC RSUs that the V2X UE is able to detect, or a channel load of each channel of each of the DSRC RSUs that the V2X UE is able to detect.

In Example 20, the subject matter of Examples 14-19) includes, wherein: the offloading information comprises a channel configuration, a frequency configuration, a Timing Advertisement and a master information block (MIB) of the DSRC RSU.

In Example 21, the subject matter of Examples 14-20 includes, wherein: the DSRC measurements are provided in at least one of a buffer status report (BSR) media access control (MAC) control element, a DSRC MAC control element or a RRC measurement report.

In Example 22, the subject matter of Examples 14-21 includes, wherein: the DSRC measurements are provided in a measurement report that includes DSRC presence fields, control channel (CCH) measurements and shared channel (SCH) measurements.

Example 23 is a computer-readable storage medium that stores instructions for execution by one or more processors of a vehicle-to-anything (V2X) user equipment (V2X UE), the one or more processors to configure the V2X UE to: communicate data of a V2X service with a cellular roadside unit (RSU); generate a dedicated short range communication (DSRC) measurement report comprising DSRC measurements for signals from a DSRC RSU based on DSRC measurement information and DSRC reporting information received from the cellular RSU; receive an offload message from the cellular RSU, the offload message comprising a Wireless Access in Vehicular Environment Basic Service Set (WBSS) identity of the DSRC RSU and an identification of the V2X service; and start communicating data of the V2X service from the DSRC RSU rather than the cellular RSU in response to reception of the offload message.

In Example 24, the subject matter of Example 23 includes, wherein: the DSRC reporting information indicates that individual measurements of the DSRC measurement information are to be aggregated into a log file and reported in response to an occurrence of a predetermined event.

In Example 25, the subject matter of Examples 23-24 includes, wherein: the DSRC measurement information comprises, for each of a plurality of DSRC channels: a DSRC channel type, a channel number, a measurement periodicity, a measurement type, a list of DSRC RSUs that the V2X UE is able to detect, a power level of each signal received from the DSRC RSUs that the V2X UE is able to detect, and a channel load of each channel of each of the DSRC RSUs that the V2X UE is able to detect.

In Example 26, the subject matter of Examples 23-25 includes, wherein: the DSRC measurements are provided in at least one of: a buffer status report (BSR) media access control (MAC) control element, a DSRC MAC control element or a Radio Resource Control (RRC) measurement report.

In Example 27, the subject matter of Examples 23-26 includes, wherein: the DSRC measurements are provided in a measurement report that includes DSRC presence fields, control channel (CCH) measurements and shared channel (SCH) measurements.

Example 28 is a method of offloading a vehicle-to-anything (V2X) service for a V2X user equipment (V2X UE), the method comprising: communicating data of a V2X service with a cellular roadside unit (RSU); generating a dedicated short range communication (DSRC) measurement report comprising DSRC measurements for signals from a DSRC RSU based on DSRC measurement information and DSRC reporting information received from the cellular RSU; receiving an offload message from the cellular RSU, the offload message comprising a Wireless Access in Vehicular Environment Basic Service Set (WBSS) Identity of the DSRC RSU and an identification of the V2X service; and starting communicating data of the V2X service from the DSRC RSU rather than the cellular RSU in response to reception of the offload message.

In Example 29, the subject matter of Example 28 includes, wherein: the DSRC reporting information indicates that individual measurements of the DSRC measurement information are to be aggregated into a log file and reported in response to an occurrence of a predetermined event.

In Example 30, the subject matter of Examples 28-29 includes, wherein, the DSRC measurement information comprises, for each of a plurality of DSRC channels: a DSRC channel type, a channel number, a measurement periodicity, a measurement type, a list of DSRC RSUs that the V2X UE is able to detect, a power level of each signal received from the DSRC RSUs that the V2X UE is able to detect, and a channel load of each channel of each of the DSRC RSUs that the V2X UE is able to detect.

In Example 31, the subject matter of Examples 28-30 includes, wherein: the DSRC measurements are provided in at least one of: a buffer status report (BSR) media access control (MAC) control element, a DSRC MAC control element or a Radio Resource Control (RRC) measurement report.

In Example 32, the subject matter of Examples 28-31 includes, wherein: the DSRC measurements are provided in a measurement report that includes DSRC presence fields, control channel (CCH) measurements and shared channel (SCH) measurements.

Example 33 is an apparatus of a vehicle user equipment (V2X UE), the apparatus comprising: means for communicating data of a V2X service with a cellular roadside unit (RSU), means for generating a dedicated short range communication (DSRC) measurement report comprising DSRC measurements for signals from a DSRC RSU based on DSRC measurement information and DSRC reporting information received from the cellular RSU: means for receiving an offload message from the cellular RSU, the offload message comprising a Wireless Access in Vehicular Environment Basic Service Set (WBSS) identity of the DSRC RSU and an identification of the V2X service; and means for starting communicating data of the V2X service from the DSRC RSU rather than the cellular RSU in response to reception of the offload message.

In Example 34, the subject matter of Example 33 includes, wherein: the DSRC reporting information indicates that individual measurements of the DSRC measurement information are to be aggregated into a log file and reported in response to an occurrence of a predetermined event.

In Example 35, the subject matter of Examples 33-34 includes, wherein: the DSRC measurement information comprises, for each of a plurality of DSRC channels; a DSRC channel type, a channel number, a measurement periodicity, a measurement type, a list of DSRC RSUs that the V2X UE is able to detect, a power level of each signal received from the DSRC RSUs that the V2X UE is able to detect, and a channel load of each channel of each of the DSRC RSUs that the V2X UE is able to detect.

In Example 36, the subject matter of Examples 33-35 includes, wherein, the DSRC measurements are provided in at least one of a buffer status report (BSR) media access control (MAC) control element, a DSRC MAC control element or a Radio Resource Control (RRC) measurement report.

In Example 37, the subject matter of Examples 33-36 includes, wherein: the DSRC measurements are provided in a measurement report that includes DSRC presence fields, control channel (CCH) measurements and shared channel (SCH) measurements.

Example 38 is at least one machine-readable medium including instructions that, when executed by processing circuitry, cause the processing circuitry to perform operations to implement of any of Examples 1-37.

Example 39 is an apparatus comprising means to implement of any of Examples 1-37.

Example 40 is a system to implement of any of Examples 1-37

Example 41 is a method to implement of any of Examples 1-37.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In this document, the terms "including" and "in which" are used as the plain-English equivalents of the respective terms "comprising" and "wherein" Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the Following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a cellular roadside unit (RSU), the apparatus comprising:
a memory; and
a processor in communication with the memory and configured to cause the cellular RSU to:
receive, from respective dedicated short range communication (DSRC) RSUs of a plurality of DSRC RSUs:
respective capability information of the respective DSRC RSU;
respective loading of the respective DSRC RSU; and
configuration information of the respective DSRC RSU;
establish communication with a user equipment device (UE);
receive, from the UE, location information of the UE;
determine to offload the UE to a first DSRC RSU of the plurality of DSRC RSUs, wherein the determination to offload the UE to the first DSRC RSU is based on:
the location information of the UE; and
the capability information and loading of the first DSRC RSU; and
transmit, to the UE, an offload command including the configuration information of the DSRC RSU.

2. The apparatus of claim 1,
wherein the processor is further configured to cause the cellular RSU to:
transmit, to the UE, a measurement configuration; and
receive, from the UE, a measurement report based on the measurement configuration, wherein the determination to offload the UE to the first DSRC RSU is further based on the measurement report.

3. The apparatus of claim 2,
wherein the measurement configuration is event based.

4. The apparatus of claim 2,
wherein a plurality of measurement reports are received corresponding to individual measurements.

5. The apparatus of claim 1,
wherein the offload command further includes a time when offloading is to occur.

6. The apparatus of claim 1,
wherein the processor is further configured to cause the cellular RSU to provide, to the first DSRC RSU, an indication of a service to be offloaded.

7. The apparatus of claim 6,
wherein the UE is a vehicle-to-anything (V2X) UE, the service is a V2X service, and the indication comprises a provider service identifier (PSID).

8. The apparatus of claim 1,
wherein the determination to offload the UE to the first DSRC RSU is based on loading of the cellular RSU.

9. The apparatus of claim 1,
wherein the determination to offload the UE to the first DSRC RSU is based on loading of a second DSRC RSU of the plurality of DSRC RSUs.

10. The apparatus of claim 1,
wherein the determination to offload the UE to the first DSRC RSU is based on measurements by the UE of a second DSRC RSU of the plurality of DSRC RSUs.

11. An apparatus of a dedicated short range communication (DSRC) roadside unit (RSU), the apparatus comprising:
a memory; and
a processor in communication with the memory and configured to cause the DSRC RSU to:
provide, to a cellular RSU, configuration information of the DSRC RSU;
receive, from the cellular RSU, information about a user equipment device (UE) to be offloaded to the DSRC RSU, wherein the information includes an indication of a first vehicle-to-anything (V2X) service to be offloaded; and
in response to the indication of the first V2X service to be offloaded, determine to accept the first V2X service, wherein the determination is based on at least one of:
a determination that the DSRC RSU supports the first V2X service; or
loading of the DSRC RSU; and transmit, to the cellular RSU, an indication that the first V2X service is accepted.

12. The apparatus of claim 11, wherein the information includes an indication of a second V2X service to be offloaded, wherein the processor is further configured to cause the DSRC RSU to:
   determine not to accept the second V2X service, wherein the determination is based on at least one of:
      a determination that the DSRC RSU does not support the second V2X service; or
      the loading of the DSRC RSU.

13. The apparatus of claim 12, wherein the processor is further configured to cause the DSRC RSU to transmit, to the UE, an offload message.

14. The apparatus of claim 11, wherein the configuration information includes frequency and channel configuration.

15. An apparatus of a user equipment device (UE), the apparatus comprising:
   a memory; and
   a processor in communication with the memory and configured to cause the UE to:
      establish communication with a cellular roadside unit (RSU);
      detect an event;
      in response to the event, transmit, to the cellular RSU:
         location information of the UE; and
         a measurement report based on at least one measurement of a dedicated short range communication (DSRC) RSU;
      receive, from the cellular RSU, an offload command including configuration information of the DSRC RSU; and
      in response to the offload command:
         synchronize with the DSRC RSU using the configuration information; and
         exchange data with the DSRC RSU.

16. The apparatus of claim 15, wherein the offload command further includes a time when offloading is to occur.

17. The apparatus of claim 15, wherein the processor is further configured to cause the UE to:
   transmit information about the DSRC RSU to a second UE.

18. The apparatus of claim 15, wherein the processor is further configured to cause the UE to:
   transmit, to the cellular RSU, a capability report.

19. The apparatus of claim 15, wherein the event comprises a measurement reaching a threshold.

20. The apparatus of claim 19, wherein the threshold is based on a service executing on the UE.

* * * * *